April 5, 1949.　　　　　C. E. OSTER　　　　　2,466,472
CHUCK FOR RETAINING A TUBULAR MEMBER ON A SPINDLE
Filed Dec. 26, 1947　　　　　　　　　　　　　2 Sheets-Sheet 1
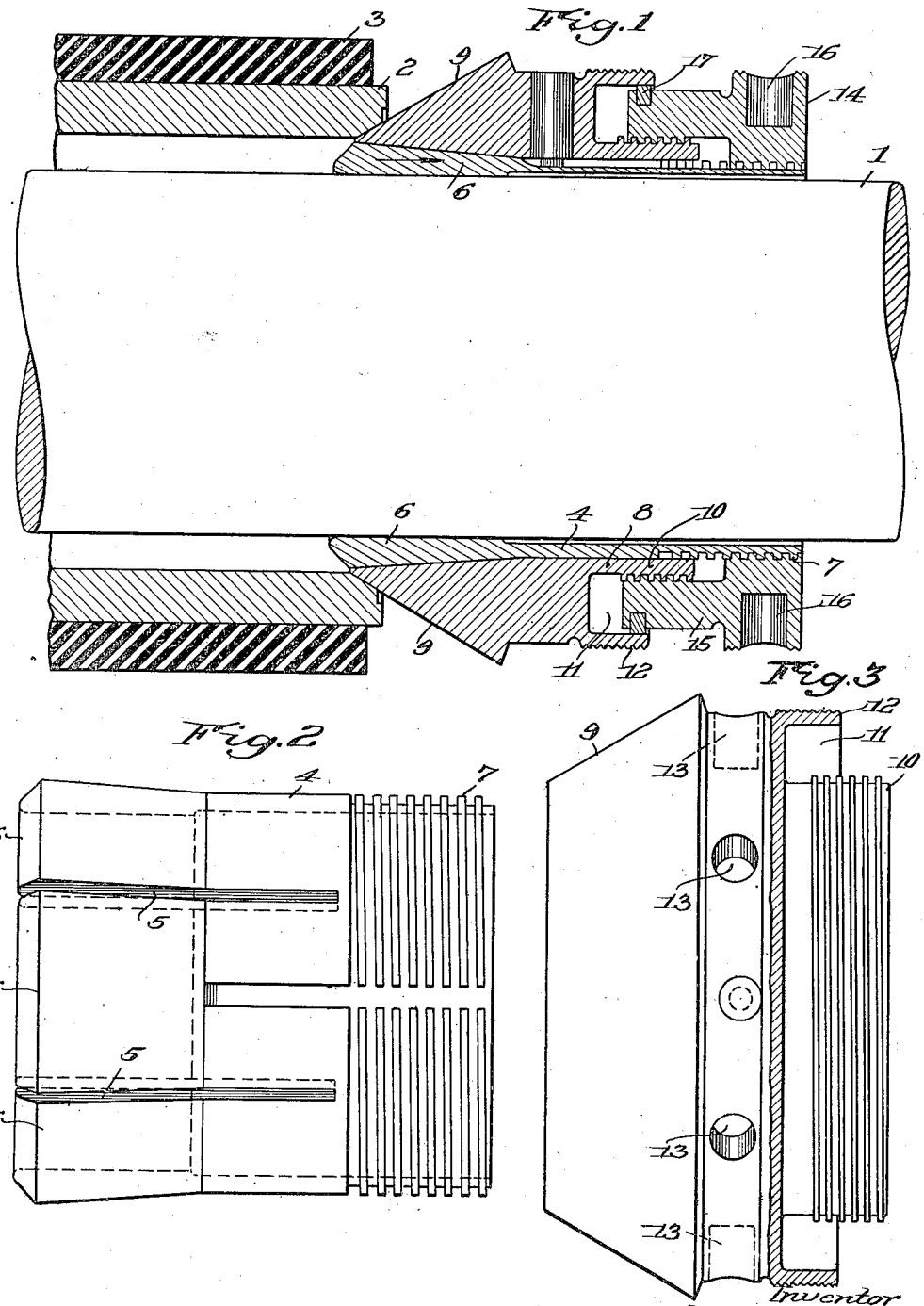
Inventor
Charles Everett Oster
By Harold E. Stonebraker
his Attorney April 5, 1949.  C. E. OSTER  2,466,472
CHUCK FOR RETAINING A TUBULAR MEMBER ON A SPINDLE
Filed Dec. 26, 1947  2 Sheets-Sheet 2
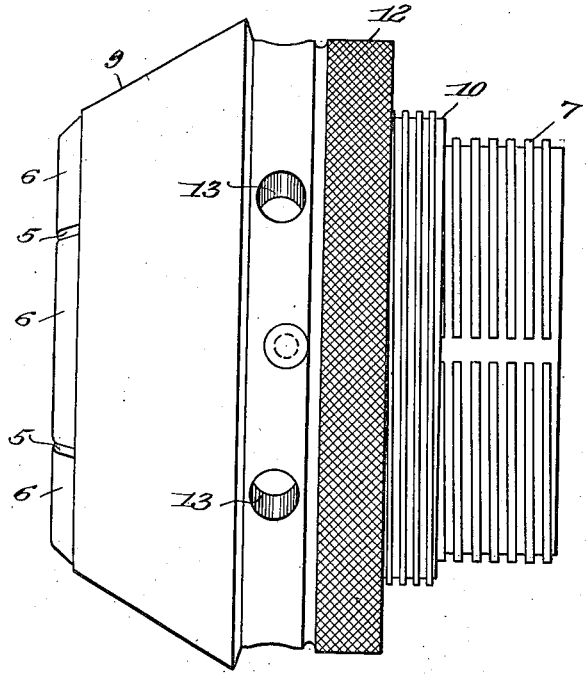
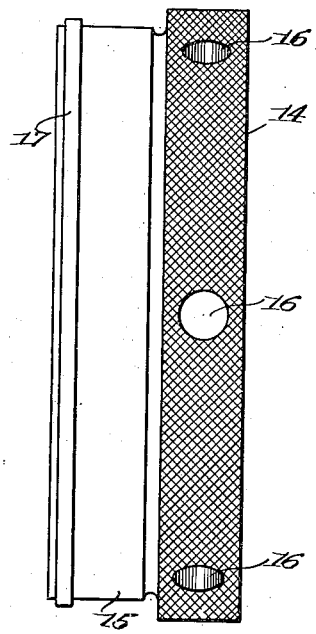
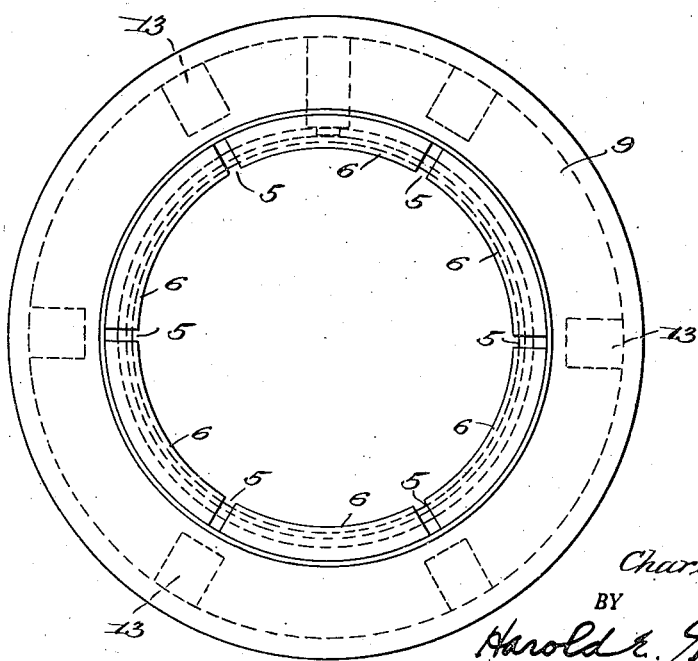
INVENTOR.
Charles Everett Oster
BY Harold E. Stonebraker
his Attorney Patented Apr. 5, 1949

2,466,472

UNITED STATES PATENT OFFICE 2,466,472

CHUCK FOR RETAINING TUBULAR MEMBERS ON SPINDLES

Charles Everett Oster, Rochester, N. Y.

Application December 26, 1947, Serial No. 793,979

12 Claims. (Cl. 279—48)

This invention relates to a chuck for retaining a tubular member on a spindle and has for its purpose to provide a practical and efficient mechanism that enables quickly and readily securing a tubular member rigidly on a spindle or releasing it for removal when required.

The invention is useful in centering and fastening a printing roll on a supporting spindle or shaft of a printing press, and a more specific purpose of the invention is to provide a structure by which a printing roll or the like can be accurately centered on its supporting shaft and rigidly clamped thereto by means of a chuck that is easily controlled and is movable endwise over the cylindrical surface of the shaft.

Another purpose of the invention is to provide a chuck of simple and economical construction with few parts, and so constructed that it can be operated to either clamping or releasing position with minimum effort and loss of time.

A further object of the invention is to afford a chuck including a collet, clamping member, and an operating ring controlling the collet and clamping member in such a manner as to enable the operating ring to effect the necessary clamping operation with a very slight movement, or fine adjustment with maximum leverage, while at the same time providing a structure that is strong and durable and designed in such a way that it will stand the necessary strains to which it is subjected under operating conditions and wear for a long time, while always insuring a tight grip and extreme rigidity of the roll on the shaft.

To these and other ends, the invention consists in the construction and arrangement of parts that will appear clearly from the following description when read in conjunction with the accompanying drawings, the novel features being pointed out in the claims following the specification.

In the drawings:

Fig. 1 is a sectional view illustrating a chuck constructed in accordance with a preferred embodiment of the invention and showing it in operative relation to a printing roll for retaining the latter on a shaft;

Fig. 2 is a view in side elevation of the collet removed;

Fig. 3 is a view in side elevation of the clamping member removed;

Fig. 4 is a view in side elevation of the clamping member positioned on the collet, and with the operating ring removed;

Fig. 5 is a view in side elevation of the operating ring, and

Fig. 6 is a view in end elevation of the clamping member and collet in operative relation.

Referring more particularly to the drawings in which like reference numerals refer to the same parts throughout the several views, 1 designates a shaft or spindle of a printing press on which it is necessary to center and clamp a printing roll consisting of a metal hollow cylinder or tube 2 provided with a rubber impression layer 3 formed in accordance with the matter to be printed, such printing rolls being removed after a printing operation is completed, and to accomplish this, they must be centered and retained tightly on the shaft by means of a suitable chuck.

The printing roll is retained at one end against a cone or other suitable retaining device that may be permanently fastened to the shaft in any desirable way while at its other end the roll is centered and held in place by a conical surface constituting part of a clamping member which is one of the elements of the removable chuck that will now be described in detail.

In the embodiment illustrated which constitutes one practical form of the invention, the clamping member is mounted upon and movable endwise of a collet that is of generally cylindrical formation interiorly and comprises a cylindrical body portion 4 with an inner end that is split longitudinally, as indicated at 5, to afford the yieldable gripping jaws 6, each of which is thickest at its inner end and of outwardly tapering cross-section, as shown in Fig. 1, affording a conical exterior surface. The outer end of the collet is threaded exteriorly at 7 for engagement with the operating ring to be described presently.

Surrounding and movable endwise of the collet while held against relative turning thereon is a clamping member having a cylindrical interior surface embracing the cylindrical body of the collet as indicated at 8, the inner end of the clamping member tapering inwardly and having an inner conical surface complementary to and engaging the adjacent conical surface afforded by the gripping jaws 6, while 9 designates the outer conical surface of the clamping member, which is adapted to engage under and to move inwardly of the adjacent conical surface on the metal roll 2 or other member to be clamped on to the shaft.

The metal roll is gripped on to the shaft when the tapered surface 9 engages the roll and the collet jaws 6 are moved outwardly of the shaft 1 with respect to the clamping member, whereby the complementary conical surfaces on the clamping member and collet jaws cause the latter to move toward the shaft and grip the latter, and this relative movement of the collet and clamping member is effected in the following manner.

The clamping member includes an outer end 10 that is threaded exteriorly and surrounds the collet, the threaded surface of the end portion 10 being spaced from the collet by the thickness of the end portion, and the clamping member is cut away or recessed at 11 adjacent to the inner end of the threaded portion and is provided with a cylindrical flange or extension 12 having an outer knurled surface by which it can be grasped, and 13 designate openings in the clamping member to permit the insertion of a spanner wrench or other suitable tool for holding the clamping member in position when making the necessary adjustment.

The clamping member and collet are moved relatively to effect the necessary clamping and releasing operations by means of an operating ring designated generally at 14. The operating ring 14 is threaded interiorly at its outer end for engagement with the exteriorly threaded portion at the outer end of the collet 4, said threaded area of the clamping ring and the cooperating threaded area of the collet being preferably provided with eight square threads per inch, and the clamping ring includes a radially offset cylindrical extension or flange 15 that surrounds the outer end of the clamping member and projects into the recess 11, the flange 15 being threaded interiorly to engage the exteriorly threaded portion at the outer end of the clamping member, and the last mentioned threaded portions on the operating ring and clamping member are provided with ten square threads per inch, thus affording a differential between them and the threaded areas of the collet and corresponding threaded portion of the operating ring so that when the ring is turned in one direction or the other, the collet moves a slightly greater distance than the clamping member.

By providing square threads, a stronger and more durable structure is afforded that will withstand the necessary strains and stresses without injuring the threaded portions, and by providing the differential between the threaded areas on the collet and clamping member and correspondingly on the operating ring, a maximum leverage is obtained for operating the collet and a minimum movement of the operating ring is required for actuating the collet the necessary distance endwise, thereby facilitating the clamping and releasing operations. 16 designate openings in the clamping ring adapted to receive a spanner wrench for turning the ring, while 17 designates a packing ring secured in a suitable recess in the operating ring and acting to prevent access of dust and dirt between the clamping member and the flange 12 of the operating ring or into the recess 11.

The threads on the collet and clamping member are both right-hand threads so that if the operating ring is turned in a clockwise direction, it will move the collet and clamping ring to a slightly different extent endwise of one another, due to the differential between the threaded portions on the collet and clamping member. This difference between the threaded portions effects the necessary relative endwise movement between the clamping member and collet and consequent gripping of the collet against the shaft between the conical surface of the clamping member and the cylindrical surface of the shaft.

In operation, the chuck with the collet and clamping member in released position is moved endwise of the shaft 1 until the conical surface 9 of the clamping member engages or is in close proximity to the adjacent conical surface of the metal roll 2. A spanner wrench or other suitable tool can then be inserted into one of the openings 13 to hold the clamping member against turning while at the same time the operator inserts a spanner wrench or tool into one of the openings 14 of the operating ring and turns the latter in a clockwise direction. This movement of the operating ring first causes the operating ring and clamping member to travel endwise inwardly until the conical surface 9 is tight against the roll 2, and further turning of the operating ring causes it to travel inwardly over the threaded portion of the clamping member and partially into the recess 11, while at the same time the clamping member remains stationary and the collet and clamping jaws 6 are drawn outwardly, the clamping jaws being thus forced into gripping engagement with the shaft by the complementary conical surface of the clamping member engaging the adjacent conical surfaces of the jaws 6. Such outward movement of the collet and gripping jaws 6 is somewhat greater than the relative endwise movement between the operating ring and clamping member due to the difference between the number of threads per inch in the threaded areas of the collet and clamping member, and this causes the collet to travel a greater distance outwardly than the operating ring travels inwardly for a given turning of the operating ring, and consequently a very slight turning of the operating ring is sufficient to impart the necessary endwise movement to the collet and to grip the roll tightly and rigidly on the shaft, at the same time centering it accurately thereon.

When the roll is to be released from the shaft, the reverse operation is performed by suitably holding the clamping member against turning and at the same time imparting a slight turning movement to the operating ring in an anti-clockwise direction which causes the collet and gripping jaws 6 to move inwardly and away from the complementary conical surface of the gripping member. A very slight turning of the operating ring is sufficient to effect the necessary endwise movement of the collet owing to the differential between the threaded portions already described, and the great leverage thus exerted on the collet insures quick release of the parts and prevents sticking of the collet to the cylinder and clamping member, so that turning of the operating ring and release of the collet can always readily be effected without the necessity of any other means for separating the parts by force.

While the invention has been described with reference to the particular construction herein disclosed, it is not confined to the details herein illustrated and described, and this application is intended to cover such modifications or departures as may come within the intent and purposes of the improvements and the scope of the following claims.

I claim:

1. A chuck comprising a cylindrical collet, a cylindrical clamping member mounted on and movable endwise of the collet, and an operating ring having threaded engagement with the collet and with the clamping member.

2. A chuck comprising a cylindrical collet threaded exteriorly at its outer end and having a longitudinally split inner end affording yieldable gripping portions, a cylindrical clamping member mounted upon and movable endwise of the collet, the clamping member having an exteriorly threaded portion at its outer end, and an operating ring in threaded engagement with the collet and having an interiorly threaded cylindrical extension spaced from the collet and engaging said threaded portion on the clamping member.

3. A chuck comprising a cylindrical collet, a cylindrical clamping member mounted on and movable endwise of the collet, and an operating ring having threaded engagement with the collet and with the clamping member, the collet and clamping member having complementary engaging conical faces and the clamping member having an exterior conical clamping face at its inner end.

4. A chuck comprising a cylindrical collet threaded exteriorly at its outer end and having a longitudinally split inner end affording yieldable gripping portions, a cylindrical clamping member mounted upon and movable endwise of the collet, the clamping member having an exteriorly threaded portion at its outer end, and an operating ring in threaded engagement with the collet and having an interiorly threaded cylindrical extension spaced from the collet and engaging said threaded portion of the clamping member, the collet and clamping member having complementary engaging conical faces and the clamping member having an exterior conical clamping face at its inner end.

5. A chuck comprising a cylindrical collet, a cylindrical clamping member mounted on and movable endwise of the collet, and an operating ring having threaded engagement with the collet and with the clamping member, one of said parts having a greater number of threads per inch engaging the operating ring than the other.

6. A chuck comprising a cylindrical collet, a cylindrical clamping member mounted on and movable endwise of the collet, and an operating ring having threaded engagement with the collet and with the clamping ring, the collet and clamping member having complementary engaging conical faces and the clamping member having an exterior conical clamping face at its inner end, the clamping member and cooperating portion of the operating ring having a greater number of threads to the inch than the collet and cooperating portion of the operating ring.

7. A chuck comprising a cylindrical collet threaded exteriorly at its outer end and having a longitudinally split inner end affording yieldable gripping portions, a cylindrical clamping member mounted upon and movable endwise of the collet, the clamping member having an exteriorly threaded portion at its outer end, and an operating ring in threaded engagement with the collet and having an interiorly threaded cylindrical extension spaced from the collet and engaging said threaded portion of the clamping member, the collet and clamping member having complementary engaging conical faces and the clamping member having an exterior conical clamping face at its inner end, the clamping member and cooperating portion of the operating ring having a greater number of threads per inch than the collet and cooperating portion of the operating ring.

8. A chuck comprising a cylindrical collet, a cylindrical clamping member mounted on and movable endwise of the collet, and an operating ring having threaded engagement with the collet and with the clamping member, the collet and clamping member having complementary engaging conical faces and the clamping member having an exterior conical clamping face at its inner end, the clamping member and collet having a different number of threads to the inch for cooperation with the correspondingly threaded portions on the operating ring.

9. A chuck comprising a cylindrical collet threaded exteriorly at its outer end and having a longitudinally split inner end affording yieldable gripping portions, a cylindrical clamping member mounted upon and movable endwise of the collet, the clamping member having an exteriorly threaded portion at its outer end, and an operating ring in threaded engagement with the collet and having an interiorly threaded cylindrical extension spaced from the collet and engaging said threaded portion of the clamping member, the collet and clamping member having complementary engaging conical faces and the clamping member having an exterior conical clamping face at its inner end, the clamping member and collet having a different number of threads to the inch for cooperation with the correspondingly threaded portions on the operating ring.

10. A chuck comprising a cylindrical collet, a cylindrical clamping member mounted on and movable endwise of the collet, and an operating ring having threaded engagement with the collet and with the clamping member, the collet and clamping member having complementary engaging conical faces and the clamping member having an exterior conical clamping face at its inner end, the collet and correspondingly threaded portion of the operating ring having eight square threads per inch and the clamping member and correspondingly threaded portion of the operating ring having ten square threads per inch.

11. A chuck comprising a cylindrical collet threaded exteriorly at its outer end and having a longitudinally split inner end affording yieldable gripping portions, a cylindrical clamping member mounted upon and movable endwise of the collet, the clamping member having an exteriorly threaded portion at its outer end, and an operating ring having threaded engagement with the collet and having an interiorly threaded cylindrical extension spaced from the collet and engaging said threaded portion of the clamping member, the collet and clamping member having complementary engaging conical faces and the clamping member having an exterior conical clamping face at its inner end, the collet and correspondingly threaded portion of the operating ring having eight square threads per inch and the clamping member and correspondingly threaded portion of the operating ring having ten square threads per inch.

12. A chuck comprising a cylindrical collet threaded exteriorly at its outer end and having a longitudinally split inner end affording yieldable gripping portions of outwardly tapering cross-section, a cylindrical clamping member mounted upon and movable endwise of the collet and having an inner end of inwardly tapering cross-section, the clamping member having an exteriorly threaded portion at its outer end, and an operating ring having threaded engagement with the collet and having an interiorly threaded cylindrical extension spaced from the collet and engaging said threaded portion of the clamping member, the collet and clamping member having complementary engaging conical faces and the clamping member having an exterior conical clamping face at its inner end, the collet and correspondingly threaded portion of the operating ring having eight square threads per inch and the clamping member and correspondingly threaded portion of the operating ring having ten square threads per inch.

CHARLES EVERETT OSTER.

REFERENCES CITED

The following references are of record in the file of this patent:

UNITED STATES PATENTS

| Number | Name | Date |
|---|---|---|
| 1,244,865 | Krohn | Oct. 30, 1917 |
| 1,582,453 | Diestan | Apr. 27, 1926 |
| 1,891,405 | Ericksson | Dec. 20, 1932 |
| 2,072,297 | Damm | Mar. 2, 1937 |